US007502003B2

United States Patent
Lipton et al.

(10) Patent No.: US 7,502,003 B2
(45) Date of Patent: Mar. 10, 2009

(54) METHOD FOR ELIMINATING PI-CELL ARTIFACTS

(75) Inventors: Lenny Lipton, Greenbrae, CA (US); Jeffrey J. Halnon, Richmond, CA (US); Jeff Wuopio, Petaluma, CA (US); Bruce Dorworth, Vacaville, CA (US)

(73) Assignee: REAL D, Beverly Hills, CA (US)

( * ) Notice: Subject to any disclaimer, the term of this patent is extended or adjusted under 35 U.S.C. 154(b) by 713 days.

(21) Appl. No.: 09/766,130

(22) Filed: Jan. 19, 2001

(65) Prior Publication Data

US 2002/0003509 A1 Jan. 10, 2002

Related U.S. Application Data

(60) Provisional application No. 60/177,393, filed on Jan. 20, 2000.

(51) Int. Cl.
*G09G 3/36* (2006.01)
(52) U.S. Cl. .............................. 345/87; 345/7; 345/30; 345/94; 345/95; 345/96; 359/462; 349/15; 348/42
(58) Field of Classification Search ................. 345/7–9, 345/30, 87, 94–96; 359/63, 78, 83, 102, 359/92, 88, 196, 618, 462–465; 340/805, 340/784; 348/51–56, 57, 42–46; 349/15
See application file for complete search history.

(56) References Cited

U.S. PATENT DOCUMENTS

| 4,792,850 | A | * | 12/1988 | Liptoh et al. | 358/92 |
| 5,181,133 | A | * | 1/1993 | Lipton | 359/84 |
| 5,541,619 | A | * | 7/1996 | Hayashi et al. | 345/96 |
| 5,815,222 | A | * | 9/1998 | Matsuda et al. | 349/1 |
| 5,917,562 | A | * | 6/1999 | Woodgate et al. | 349/15 |
| 6,057,811 | A | * | 5/2000 | Edwards | 345/8 |
| 6,184,969 | B1 | * | 2/2001 | Fergason | 349/196 |
| 6,268,840 | B1 | * | 7/2001 | Huang | 345/94 |
| 6,348,957 | B1 | * | 2/2002 | Yamazaki et al. | 349/15 |

* cited by examiner

*Primary Examiner*—Richard Hjerpe
*Assistant Examiner*—Jennifer T Nguyen
(74) *Attorney, Agent, or Firm*—Smyrski Law Group, A P.C.

(57) ABSTRACT

An alternating unipolar carrier waveform is used to drive a pi-cell modulator. The pi-cell is driven by the carrier, but the carrier never changes polarity within the time period that the cell is energized. However, each time the cell is energized, i.e., once per field, the polarity alternates. Further, a burst of pulses each separated by a short rest period is used on initial application of power to more quickly drive the pi-cell to its activated state.

20 Claims, 6 Drawing Sheets

METHOD FOR ELIMINATING PI-CELL ARTIFACTS

This application claims priority to U.S. Provisional Patent Application No. 60/177,393, filed Jan. 20, 2000, and entitled "METHOD FOR ELIMINATING PI-CELL ARTIFACTS" which is hereby incorporated herein by reference.

BACKGROUND OF THE INVENTION

StereoGraphics Corporation of San Rafael, Calif., introduced the push-pull ZScreen® modulator using pi-cell technology for direct viewing of stereoscopic images on monitors in 1987. The technology used in these products is described in U.S. Pat. No. 4,792,850 to Lipton et al. entitled Method and System Employing a Push-Pull Liquid Crystal Modulator. A version of the push-pull product continues to be manufactured by StereoGraphics for use in conjunction with high-end CRT based projectors.

In 1998, StereoGraphics re-introduced a pi-cell modulator having a different design, which is intended for use with a CRT based monitor image. The technology basis for this product is described in an article by L. Lipton, et. al., entitled "*An Improved Byatt Modulator,*" *Stereoscopic Displays and Virtual Reality Systems V*, Vol. 3295, pp. 121-126, SPIE, 1998, and in disclosed in co-pending application Ser. No. 09/381,916, which has been published as WO 98/44746.

There is a considerable body of literature that describes the functioning of the pi-cell, including the following: U.S. Pat. No. 4,884,876 to Lipton et al., U.S. Pat. No. 4,719,507 to Bos, and U.S. Pat. No. 4,566,758 to Bos.

The following references discuss the use of a pi-cell device in the form of a large modulator for field switching: *High-Performance 3-D Viewing Systems Using Passive Glasses* by Bos et al. (p. 450, *SID '88 Digest*) and *Field-Sequential Stereoscopic Viewing Systems Using Passive Glasses* by Haven (Proceedings of the SID, vol. 30/1, 1989). In addition, Johnson and Bos, in their article *Stereoscopic Display Performance* (ELECTRONIC IMAGING EAST CONFERENCE, Building Application Solutions with Today's Imaging Tools, 1990), describe in detail how the Byatt shutter improves performance in terms of suppression of ghosting created by phosphor afterglow.

Twisted-nematic (TN) technology, the most commonly used liquid crystal technology, owes its electro-optical effect to optical activity, which is produced by light traversing the bulk of the material. The physics of pi-cells, on the other hand, is explained by a phase shift created by retardation occurring at the surface layer or that immediately adjacent to the director alignment layer. It is this phase shift that enables the pi-cell to modulate or even produce circularly polarized light that makes it particularly interesting for stereoscopic display applications. At one time it was the speed of the pi-cell that was considered to be its most important attribute, but its speed has been matched in recent years by improved twisted-nematic devices.

The most important characteristic of the pi-cell is that it is a phase shifting device, and thus it can readily produce circularly polarized light.

Because pi-cell properties are so heavily dependent upon the surface effect, the device tends to have difficulties associated with this boundary region and is especially sensitive to rub defects and ion contamination. In addition, while TN parts usually become fully functional, i.e., turn on rapidly, pi-cells may take many seconds to go fully pi. The result can be disturbing artifacts which appear as hazy, mottled, or streaked areas, which greatly detract from the pleasure of the viewing experience.

The difficulties can be broken down into two types: those which occur upon start-up and which may well eventually clear with the passage of time, and those that persist indefinitely. Accordingly, we have developed means for overcoming both kinds of defects.

The traditional technique for driving pi-cells has been to use a waveform modulated by a carrier with a frequency of one to two kHz. However, we have found that for pi-cell parts made in some factories, the technique is not a good one. We have therefore created a unique driving approach using a modified carrier waveform, and in addition, what we term a "stutter start," to overcome the artifacts described above.

As mentioned above, StereoGraphics has been producing products utilizing pi-cell technology for viewing of stereoscopic images since 1987. The original product was a ZScreen® modulator that was placed in front of a monitor. This particular configuration was effectively phased out with the introduction of CrystalEyes® modulating eyewear in 1989. StereoGraphics now manufactures a different configuration of the ZScreen product for use in conjunction with high-end CRT based projectors. The current ZScreen product uses a modest size (6 inches square) liquid crystal panel.

As noted above, in 1998, we reintroduced a pi-cell modulator of a different design, which is intended for use with a CRT based monitor image. This is a large panel (16" by 12¼") and as such, the material cost is relatively expensive. We were looking for ways to reduce our costs by improving the yield.

Our yields were being affected by a number of factors, many of which we were able to address in the manufacturing process. Despite our process improvements, we continued to produce a number of liquid crystal cells that failed our previous quality standards. Rather than lowering our standards to accept these cells, we sought a technique to drive them with a different waveform. By this means we hoped the cells would pass our inspections.

We were concerned with two defects that occurred frequently. One problem that we encountered was the reluctance of a particular cell (or more specifically a small portion of a cell) to "go pi." By that we mean that parts of the cell did not properly modulate the polarization in response to the driving waveform. While the majority of the cell area performed properly, it was common for some areas to take a few seconds or even a few minutes before reaching complete effectiveness. After the cell went pi, the modulating effect was completely normal. This problem would recur if the cell had been inactive for as little as a few seconds.

The other problem that we encountered was a visible "shadow" in an area of a cell that developed during normal operation. It would not normally be visible until after many minutes (or even hours) of operation. Invariably this shadow defect took the form of a small triangle 101 located at the lower right of each of the five electrode segments of the exemplary cell 102 as shown in FIG. 1. We believe the cause of this defect to be free ions contaminating the liquid crystal material, and as such we call this defect the "ion shadow" defect.

The number of cells that had either defect was low. The vast majority of cells went pi in less than five seconds, and did not develop ion shadows even after hundreds of hours of operation.

Since the inception of pi-cells, they have generally been driven by an alternating polarity waveform of the sort shown in FIG. 2. Bursts of a carrier 201 of 1-2 kHz or so, which activate the cell, occur every other field. When the cell is inactive, the voltage across it is zero. This waveform has a net DC value of zero volts, with the result that the integral of the voltage applied across the cell over a long period of time is zero. The cell spends the same amount of time with a positive voltage across it as it does with a negative voltage across it. This is required to prevent the breakdown of the cell through transmigration of the electroplating from one electrode to the other.

StereoGraphics developed an alternate driving waveform, shown in FIG. 3, which is used in a number of products. This "quasi-static" waveform retains the net DC value of zero volts but eliminates the carrier by inverting every other field. A positive drive signal 301 is applied for a time equal to one field. During the next field the drive signal 302 is zero. A negative drive signal 303, exactly equal in amplitude and opposite in polarity is applied during the third field. The fourth field drive signal 304 is zero once again. The four-field pattern repeats indefinitely.

A variation of this waveform, shown in FIG. 4, is used in the current Monitor ZScreen product. In the modified quasi-static waveform, a small bias voltage is placed across the cell when it is not activated. This bias voltage allows the segments of the cell to appear more uniform, thus making the segment boundaries less noticeable. The positive and negative drive signals 401 and 403 are equal and analogous to the drive signals 301 and 303 in FIG. 3. The difference lies in the off-state drive signals. In these off-states, a small bias voltage is applied, first a negative bias voltage 402 (opposite polarity to 401), then after 403, a positive 404 bias voltage (opposite polarity to the previous drive voltage).

SUMMARY OF THE INVENTION

The present invention is a driving waveform for a pi-cell modulator, In accord with the invention, an alternating unipolar carrier waveform is used to drive a pi-cell modulator The pi-cell is driven by the carrier, but the carrier does not change polarity within the time period that the cell is energized. However, each time the cell is energized, i.e., once per field, the polarity alternates. Further, a burst of pulses each separated by a short rest period is used on initial application of power to more quickly drive the pi-cell to its activated state.

DETAILED DESCRIPTION OF THE INVENTION

Figure 1:
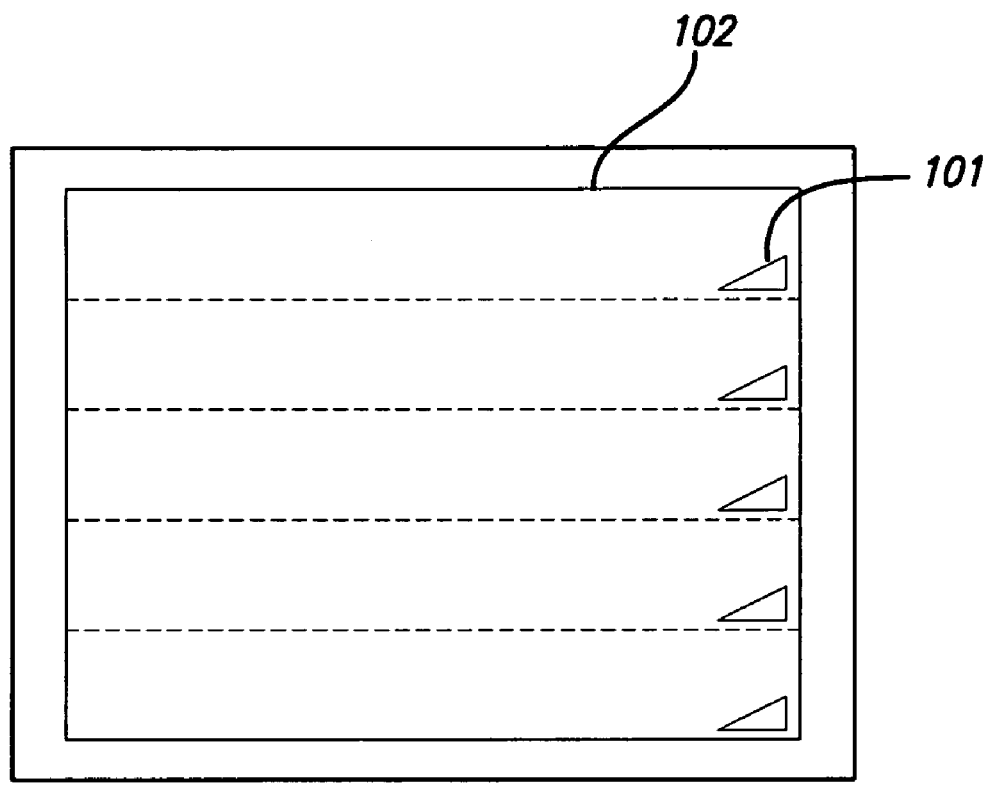
FIG. 1 is drawing showing the ion shadow defect locations.
Figure 2:
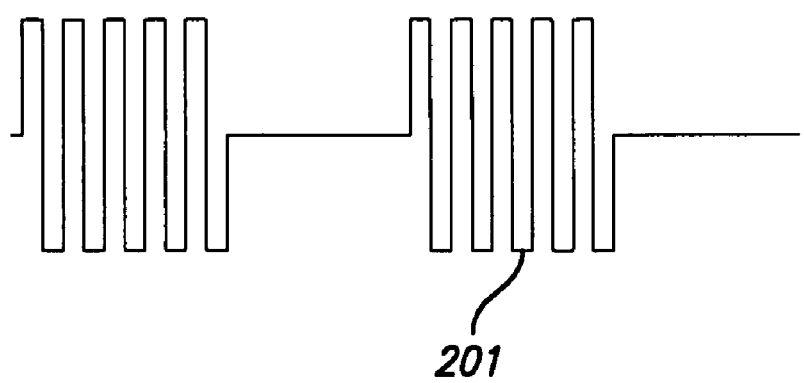
FIG. 2 is a graph of the conventional driving waveform.
Figure 3:
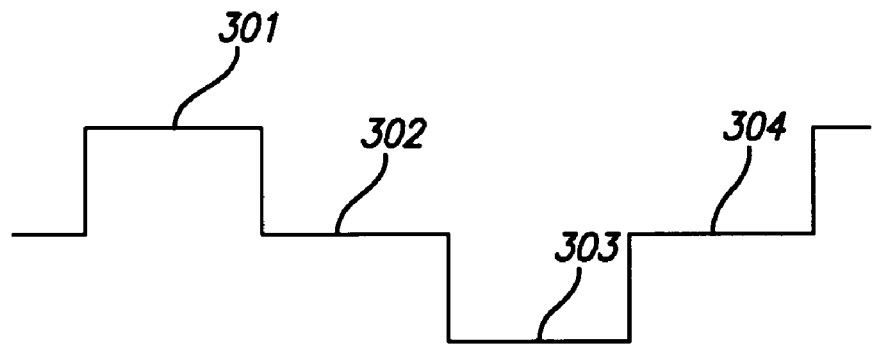
FIG. 3 is a graph of the quasi-static driving waveform.
Figure 4:
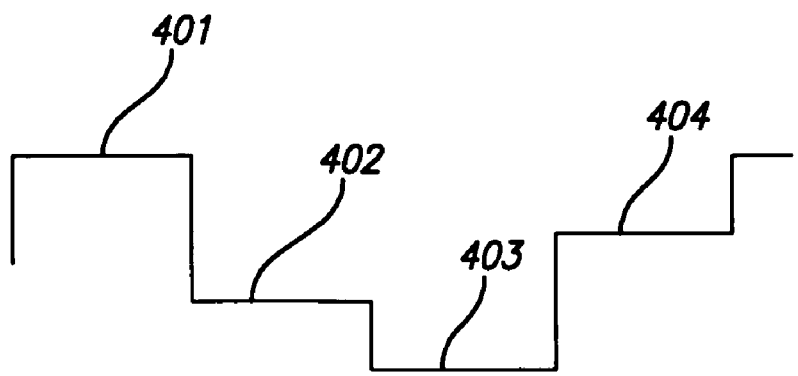
FIG. 4 is a graph of the modified quasi-static driving waveform.

It was the belief of experts in the field that the ion shadow problem in our existing products was caused, or at least exacerbated, by the lack of a carrier. Thus, we questioned the wisdom of using the quasi-static waveform as shown in FIG. 3. In our laboratory, we looked at both the subjective and objective impact of an experiment. In addition to mounting a ZScreen panel in front of a monitor and observing the subjective image quality, we mounted it between a light source and a photometer (with an analyzer polarizer) and measured its objective performance. The results of each test, and the differences between the two methods, proved interesting.

Figure 5:
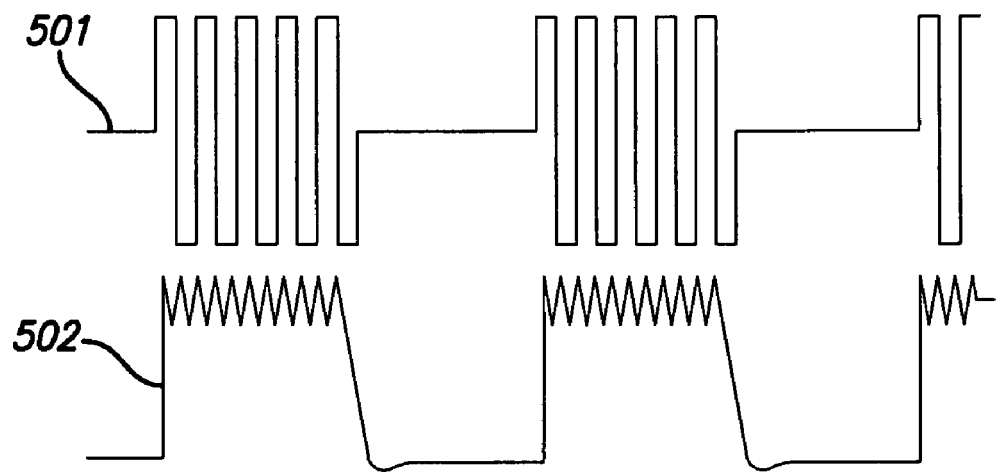
FIG. 5 is a graph of the conventional waveform optical response.

FIG. 5 shows the photometer measurement of the response of a cell driven by the conventional carrier-based waveform. The upper trace 501 shows the drive waveform, and the bottom trace 502 shows the photometer output. The cell passed the light when activated, and blocked it when not activated. The transmission of the cell (and hence its dynamic range) is degraded approximately 30% each time the driver changes direction. The results are relatively consistent throughout a fairly wide range of carrier frequencies, from a few hundred to a couple of thousand Hz. Ion shadows were virtually eliminated.

Unfortunately, the subjective tests revealed problems. When the carrier was synchronized to the field rate (i.e. driven from a phase-locked-loop operating at 8 times the vertical refresh rate), there was visible horizontal banding. The reason for this is that the modulation of the transmission occurs repeatedly in the same location on the screen. To prevent this, an asynchronous carrier can be used, so that the modulation occurs at random locations over time distributed evenly throughout each segment. Tests done with an asynchronous carrier showed that the image quality suffers somewhat, being a bit "soft" as compared to the quasi-static waveform.

Figure 6:
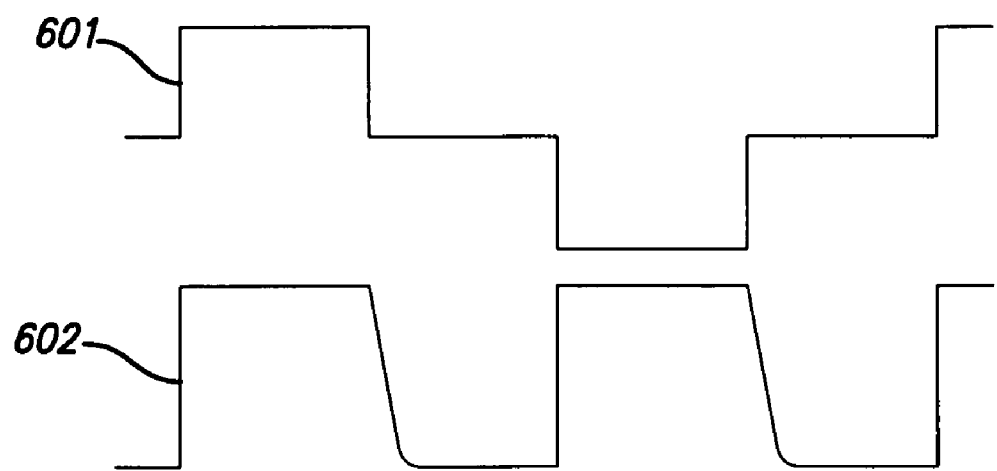
FIG. 6 is a graph of the quasi-static waveform optical response.

FIG. 6 shows the photometer measurement of the response of a cell driven by the quasi-static waveform. The upper trace 601 shows the drive waveform, and the bottom trace 602 shows the photometer output.

Figure 7:
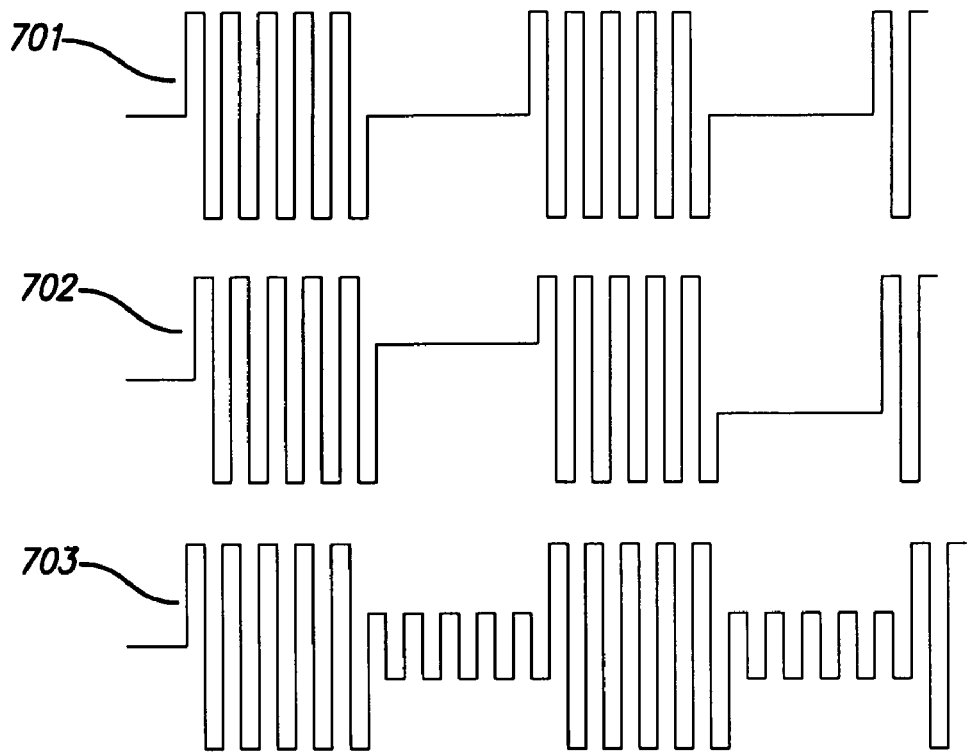
FIG. 7 is a graph of the bias options with a carrier.

In addition to these problems, the beneficial effect of the bias was reduced. Whenever the carrier is used, the segment lines tend to be visible despite the bias applied. We looked at a series of bias approaches, and all yielded similar results. FIG. 7 shows three of these drive waveform options; zero bias (701), DC bias (702), and AC bias (703).

If a carrier seems to eliminate the ion shadow defect, but leaves a visible artifact, then two questions remain to be answered: how much carrier is required to eliminate the ion shadow defect, and how little carrier can be tolerated without leaving a visible artifact? A series of experiments led us to a new driving waveform that is quite literally a combination of the two shown above.

Figure 8:
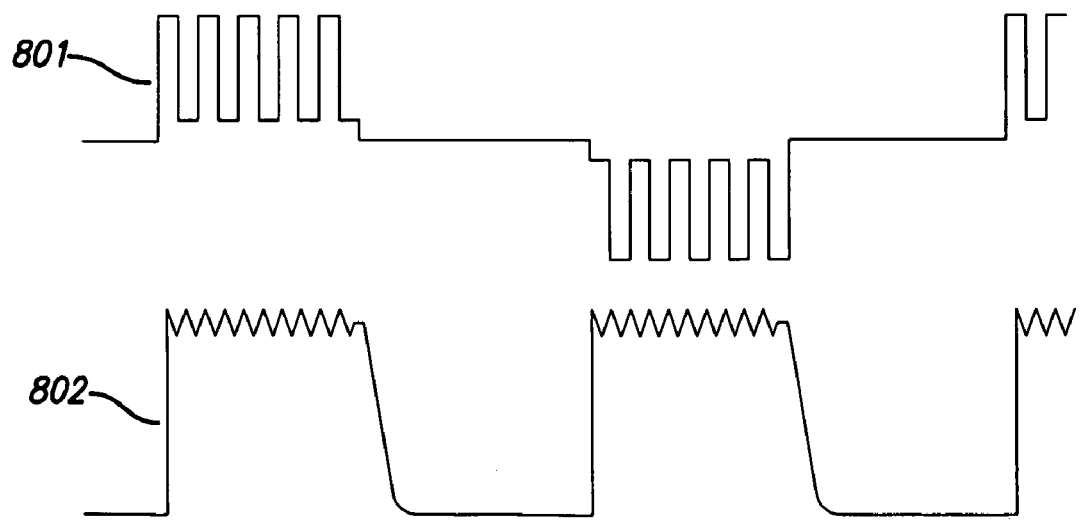
FIG. 8 is a graph of the Alternating Unipolar Carrier response.

The experiments showed there was a significant effect of the driving waveform crossing through zero. We created a new type of waveform that has a carrier, but where the carrier does not cross through zero. We called this waveform an Alternating Unipolar Carrier System. FIG. 8 shows the photometer measurement of the response of a cell driven by an Alternating Unipolar Carrier. The upper trace 801 shows the drive waveform, and the bottom trace 802 shows the photometer output.

The advantage of the Alternating, Unipolar-Carrier waveform is that it has less of a visible artifact than the conventional carrier waveform but reduces the appearance of ion migration defects compared to the quasi-static waveform. The peak activation voltage, the intermediate activation voltage, and the nature and values of bias all have an impact on the image quality. In fact a carrier of sorts can be applied to the inactive state as a bias voltage. The value of the bias has much less impact than the peak-to-peak value of the carrier.

Figure 9:
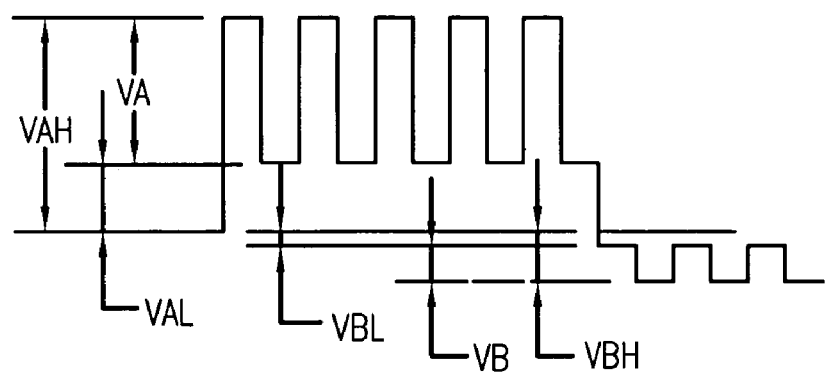
FIG. 9 shows the parameters of the Alternating Unipolar Carrier

Referring to FIG. 9, the activation voltage VA is defined by the high and low voltages VAH and VAL. Likewise, the bias voltage VB is defined by high and low bias voltages VBH and VBL. The polarity of a particular point in the waveform is arbitrary, because the pattern repeats around zero. Thus we will assume that VAH is always a positive signal. The pattern created through the first two fields will be repeated in the alternate polarity in the last two fields.

Even though VAH may be considered positive, the polarity of VAL is significant. If VAH=−VAL with VBH=VBL=0, then we have described the conventional carrier waveform. If VAL=VAH with VBH=VBL=0, however, we have described the quasi-static waveform. Table 1 shows, in general, the impact of different parameter changes on the dynamic range and viewing experience, the tendency to develop ion shadow defects, and on the visibility of segment lines. The entries in bold indicate the condition that is optimum for that particular area of concern. The italicized entries indicate the condition that is least desirable for that area of concern.

TABLE 1

Effects of Waveform Parameters

| Parameter | Dynamic Range and Viewing Experience | Ion Shadow Defects | Visibility of Segment Lines |
|---|---|---|---|
| VAH Increasing with VB = 0 | Improves | No effect | *Slightly more visible* |
| VA Increasing (VAL positive w.r.t. VAH with VB = 0) | Dynamic range suffers somewhat (horizontal banding or image 'softness' increases) | Somewhat decreases | No effect |
| VA Increasing (VAL negative w.r.t. VAH with VB = 0) | *Dynamic range suffers significantly (horizontal banding or image 'softness' increases)* | Decreases | No effect |
| VBH Increasing (positive w.r.t. VAH) with VB = 0 | Somewhat decreases | *Increases* | Somewhat decreases |
| VBH Increasing (negative w.r.t. VAH) with VB = 0 | Somewhat decreases | Increases | Decreases |
| VB Increasing | Somewhat decreases | Somewhat increases | No consistent effect |

Our efforts to accelerate a sluggishly responding cell yielded interesting results. We looked at the fundamental response of a cell. In this entire group of experiments we used a combination of positive pulses, negative pulses, and alternating pulses. The polarity of a pulse had no effect on its optical response.

In the following discussion the term "state" refers to the optical response of the cell; that is, blocking or transmitting light when viewed through a particular analyzer polarizer. The cell changes state in milliseconds in response to the instantaneous voltage applied across it. The term "mode" refers to the general condition of the cell—relaxed or pi. The cell requires seconds or perhaps minutes to change modes from relaxed to pi or back again. We found that the optical state of the cell is a function of the operating mode of the cell; and that the operating mode of the cell is a function of its recent excitation history.

Figure 10:
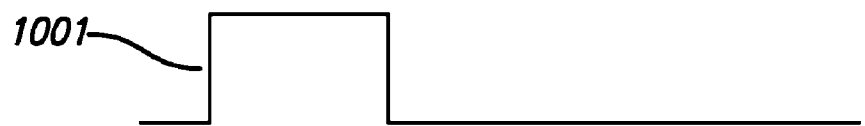
FIG. 10 is a graph of the single pulse response in the relaxed mode.
Figure 10:
Figure 10:
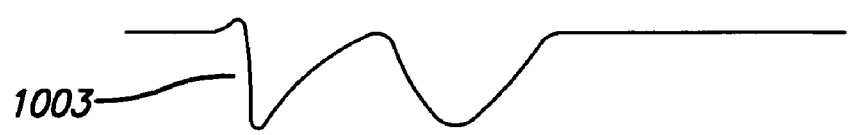

FIG. 10 shows the response of a "relaxed" cell to a single pulse. The cell has been off (shorted) for a long time, many minutes. In this figure, the top trace 1001 shows the voltage applied across the cell. The middle trace 1002 shows the current through the cell. The bottom trace 1003 shows the result on the photometer.

Figure 11:
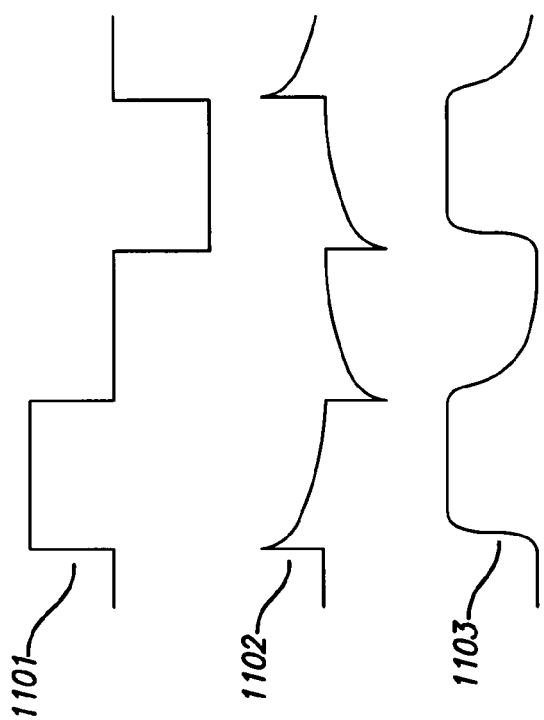
FIG. 11 is a graph of the repeated pulse response in the pi mode.

Compare the response in FIG. 10 to the response of a cell that has gone pi and has been operating for some time as shown in FIG. 11. In this figure, the top trace 1101 shows the voltage applied across the cell. The middle trace 1102 shows the current through the cell. The bottom trace 1103 shows the result on the photometer. In particular, note the following differences between the two scenarios:

TABLE 2

Relaxed vs. pi Responses

| Characteristic | Relaxed Mode Response (FIG. 10) | Pi Mode Cell Response (FIG. 11) |
|---|---|---|
| Optical state of the cell when not energized | Transmissive | Blocking |
| Delay between a change in drive voltage and a change in optical state | ~600 μsec | ~200 μsec |
| Response to energization | Goes from transmissive to blocking and then back to transmissive again | Goes from blocking to transmissive |
| Impedance of cell | Changes as a function of the optical response | Consistent throughout a pulse |

Figure 12:
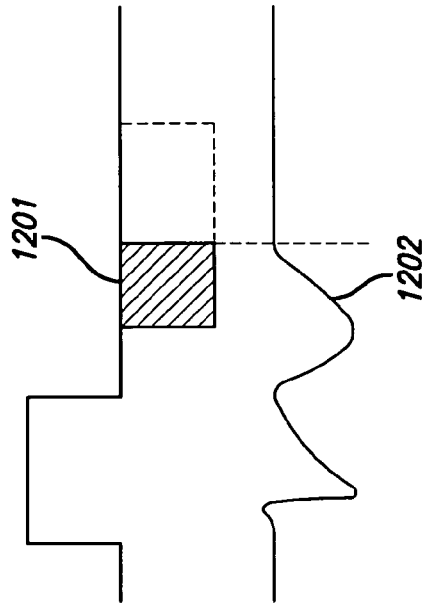
FIG. 12 is a graph of the optimum period of the next pulse.

The cell goes through a transition from one mode to another. Referring to FIG. 10, if repeated pulses are applied to the cell, and those pulses occur infrequently enough, the cell does not change mode from relaxed to pi mode. The cell's response to a single pulse recovers so that the optical state is transmissive once again. If, however, (as shown in FIG. 12) the pulse rate increases such that a second pulse occurs during the hatched area 1201 before the optical state of the cell recovers to fully transmissive 1202, the cell can be 'pushed' into the pi mode. As the mode begins to shift from relaxed to pi, the response of the cell also shifts. There is a gradual transition from the response curve of FIG. 10 to that of FIG. 11. The length of time this transition takes is affected by the variety of parameters as described in Table 3:

TABLE 3

Parameters Affecting Mode Transition Time

| Parameter | Effect on Relaxed to π Mode Transition Time |
|---|---|
| Activation Voltage | Higher voltages make the transition time shorter |
| Pulse Width | Shorter pulses (below 2 msec) make the transition time longer |
| Pulse Period | Optimum value is when the pulse recurs just after the cell completes its state change from blocking to transmissive (subsequent to the removal of the activation voltage) |
| Carrier | Higher carrier frequencies (anything above 500 Hz) make the transition time longer |

We have described conditions and parameters that cause a Mode change from relaxed to pi. For a cell to go pi, parameters must be within a certain range. Once the cell goes pi, the range is expanded. This is similar to a phase-locked-loop where the capture range is narrower than the lock range.

Figure 13:
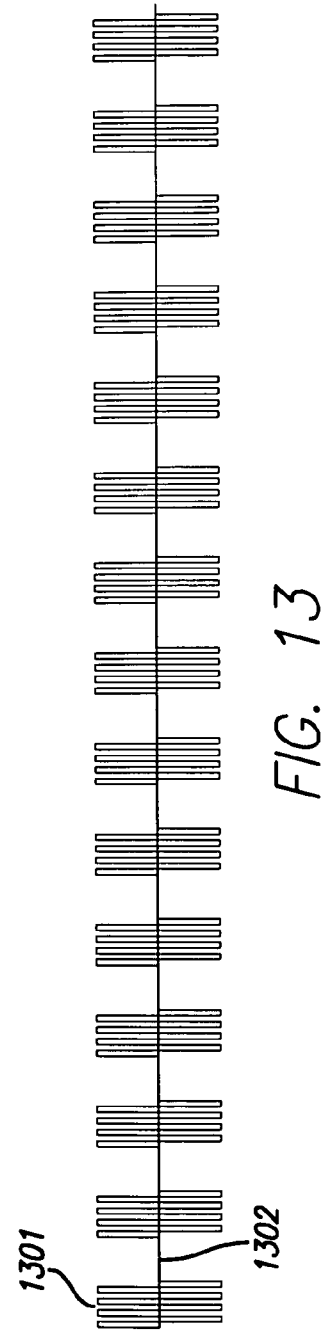
FIG. 13 is a graph of the Stutter-Start waveform.

Another interesting element of mode transition speed is that the cell is more receptive to change than to a steady drive signal. Referring to FIG. 12, if the second pulse seen by the cell starts in the hatched area 1201, the transition from relaxed to pi can be accelerated by taking a rest once in a while. The minimum transition time occurs when the drive is a series of bursts of pulses 1301 separated by a rest period of a few hundred msec 1302 as shown in FIG. 13. We call this intermittent signal a Stutter-Start. Only a few seconds of Stutter-Start are required to optimally activate the cell.

Because once a cell is in pi mode it will more easily stay in that mode, the Stutter-Start waveform is applied once when the power is first applied. During periods when the cell is not meant to be activated (i.e. there is no stereo image onscreen), the cell free-runs at an arbitrary rate, remaining in the pi mode. When the synchronization signal occurs again, the drive electronics resynchronize the activation of the segments of the cell at their proper time.

The physics of pi-cells is explained by a phase shift created by retardation occurring at the surface layer or that immediately adjacent to the director alignment layer. It is this phase shift that enables the pi-cell to produce circularly polarized light. Because pi-cell properties are so heavily dependent upon the surface effect, the device tends to have difficulties associated with this boundary region and is especially sensitive to rub defects and ion contamination. The result can be disturbing artifacts which appear as hazy, mottled, or streaked areas. In addition, pi-cells may take many seconds to go fully pi.

The difficulties can be broken down into two types: Those that occur upon start-up but eventually clear with the passage of time, and those that persist indefinitely. Accordingly, we have developed means for overcoming both kinds of defects. These are:

1. A new driving waveform, called an Alternating, Unipolar-Carrier waveform, where the cell is driven by a carrier but the carrier never changes polarity within the time period that the cell is energized. Every time the cell is energized (once per field) the polarity alternates.

2. A Stutter-Start process, where the cell is pushed into going pi more quickly by applying an optimally timed waveform and modulating it on and off for a few seconds.

We claim:

1. A method for driving a segmented pi-cell modulator in a stereoscopic image viewing system, comprising applying an alternating, unipolar-carrier waveform to the segmented pi-cell modulator, wherein the alternating, unipolar-carrier waveform does not change polarity within a time period that the segmented pi-cell modulator is energized.

2. A method as in claim 1, wherein the waveform is in the range of 1-2 kHz.

3. A method as in claim 1, wherein a stutter start waveform is applied to the segmented pi-cell modulator for a brief period of time when power is first applied.

4. A method as in claim 3, wherein the stutter start waveform is a series of pulses separated by a small rest period.

5. A method as in claim 4, wherein the small rest period is approximately a few hundred milliseconds.

6. A method as in claim 1, wherein the alternating, unipolar-carrier waveform comprises a plurality of modulating waveforms separated by periods of application of de minimis energy.

7. A method as in claim 1, wherein applying the alternating, unipolar carrier waveform to the segmented pi-cell modulator tends to reduce likelihood of at least one from a group comprising ion shadow defects and visible artifacts being exhibited by the segmented pi-cell modulator.

8. A method for driving a segmented pi-cell modulator in a stereoscopic image viewing system, comprising:
   applying a first modulating waveform having a carrier signal of a first polarity to the segmented pi-cell modulator during a first time period, wherein the carrier signal does not change polarity during the first time period;
   removing the first modulating waveform for a finite period comprising application of de minimis energy; and
   applying a second modulating waveform having a carrier signal of a second polarity opposite the first polarity to the segmented pi-cell modulator during a second time period, wherein the carrier signal does not change polarity during the second time period.

9. A method as in claim 8, wherein the waveform is in the range of 1-2 kHz.

10. A method as in claim 8, wherein a burst of pulses is applied to the segmented pi-cell modulator for a brief period of time when power is first applied.

11. A method as in claim 10, wherein each of the burst of pulses is separated by a small rest period.

12. A method as in claim 11, wherein the small rest period is approximately a few hundred milliseconds.

13. A method as in claim 8, wherein applying the first modulating waveform and second modulating waveform to the segmented pi-cell modulator tends to reduce likelihood of at least one from a group comprising ion shadow defects and visible artifacts being exhibited by the segmented pi-cell modulator.

14. A stereoscopic image viewing system, comprising: a segmented pi-cell modulator; and
   a drive circuit for applying an alternating, unipolar carrier waveform to the segmented pi-cell modulator, wherein the alternating, unipolar carrier waveform does not change polarity within a time period that the segmented pi-cell modulator is energized.

15. A system as in claim 14, wherein the carrier waveform is in the range of 1-2 kHz.

16. A system as in claim 14, wherein a burst of pulses is applied to the segmented pi-cell modulator for a brief period of time when power is first applied.

17. A system as in claim 16, wherein each of the burst of pulses is separated by a small rest period.

18. A system as in claim 17, wherein the small rest period is approximately a few hundred milliseconds.

19. A method as in claim 14, wherein the alternating, unipolar carrier waveform comprises a plurality of modulating waveforms separated by periods of application of de minimis energy.

20. A method as in claim 14, wherein wherein applying the alternating, unipolar carrier waveform to the segmented pi-cell modulator tends to reduce likelihood of at least one from a group comprising ion shadow defects and visible artifacts being exhibited by the segmented pi-cell modulator.

* * * * *

UNITED STATES PATENT AND TRADEMARK OFFICE
CERTIFICATE OF CORRECTION

PATENT NO.         : 7,502,003 B2
APPLICATION NO.    : 09/766130
DATED              : March 10, 2009
INVENTOR(S)        : Lenny Lipton et al.

Page 1 of 1

It is certified that error appears in the above-identified patent and that said Letters Patent is hereby corrected as shown below:

Column 8, Line 58, Claim 20, delete duplicate occurrence of the word "wherein"

Signed and Sealed this

Fifth Day of May, 2009

JOHN DOLL
*Acting Director of the United States Patent and Trademark Office*